United States Patent
Nickolaou et al.

(10) Patent No.: US 8,620,549 B2
(45) Date of Patent: Dec. 31, 2013

(54) VEHICLE SAFETY SYSTEMS AND METHODS

(75) Inventors: James N. Nickolaou, Clarkson, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 12/881,465

(22) Filed: Sep. 14, 2010

(65) Prior Publication Data

US 2012/0065858 A1    Mar. 15, 2012

(51) Int. Cl.
*B60Q 1/26* (2006.01)

(52) U.S. Cl.
USPC .......................................... 701/70; 340/457

(58) Field of Classification Search
USPC ............ 701/70, 301, 117, 49, 29.9; 340/471, 340/463, 468, 436, 435, 901–904, 932.2; 455/404.1, 404.2; 342/70
See application file for complete search history.

(56) References Cited

U.S. PATENT DOCUMENTS

| | | | |
|---|---|---|---|
| 5,969,603 A * | 10/1999 | Wang | 340/471 |
| 6,249,720 B1 * | 6/2001 | Kubota et al. | 701/1 |
| 6,426,706 B1 * | 7/2002 | King | 340/903 |
| 2003/0151502 A1 * | 8/2003 | Kam | 340/435 |
| 2005/0161422 A1 * | 7/2005 | Boily | 212/177 |
| 2006/0244828 A1 * | 11/2006 | Ho et al. | 348/148 |
| 2007/0188312 A1 * | 8/2007 | Bihler et al. | 340/435 |
| 2008/0042876 A1 * | 2/2008 | Bauer et al. | 340/905 |
| 2009/0040036 A1 * | 2/2009 | Talis | 340/457.1 |
| 2009/0066488 A1 * | 3/2009 | Qiahe et al. | 340/426.1 |
| 2009/0146813 A1 * | 6/2009 | Nuno | 340/572.1 |
| 2010/0161207 A1 * | 6/2010 | Do | 701/200 |
| 2010/0202346 A1 * | 8/2010 | Sitzes et al. | 370/328 |
| 2011/0298605 A1 * | 12/2011 | Lu | 340/438 |
| 2012/0253615 A1 * | 10/2012 | Kamada et al. | 701/51 |

* cited by examiner

*Primary Examiner* — Mathe Marc-Coleman

(74) *Attorney, Agent, or Firm* — Ingrassia Fisher & Lorenz P.C.

(57) ABSTRACT

A safety system is provided for use in a first vehicle at a first location. The safety system includes a position unit configured to determine the first location; a sensor group configured to detect an opening of the enclosure; a controller coupled to the position unit and the sensor group, the controller configured to generate a warning message including the first location when the opening of the enclosure is detected; and a transmitter coupled to the controller and configured to transmit the warning message.

19 Claims, 2 Drawing Sheets

VEHICLE SAFETY SYSTEMS AND METHODS

TECHNICAL FIELD

The present invention generally relates to vehicle safety systems, and more particularly relates to vehicle safety systems that prevent accidents between a vehicle and other vehicles, cyclists, or pedestrians.

BACKGROUND OF THE INVENTION

Increasingly, vehicles are being equipped with enhanced safety and communication functionality to assist drivers and improve operation. Examples of active safety systems include collision avoidance, adaptive cruise control, lane departure systems, and parking assistance systems, while enhanced communication functions may be provided by onboard telematics and GPS systems. However, the safety systems and communication systems typically do not interact with one another.

Despite these systems, drivers must still undertake a number of quick observations and actions to prevent or mitigate potentially unsafe situations. One example of an unsafe situation is the unexpected door opening by an occupant in a parked vehicle. If a door unexpectedly opens in the path of an oncoming vehicle, an accident may occur. However, conventional active safety systems do not contemplate these situations, nor are they able to predict such action by the occupant in the other vehicle. Unexpected door openings are also a concern to cyclists and pedestrians.

Accordingly, it is desirable to provide improved vehicle safety systems that prevent collisions, particularly door collisions as an occupant enters or exits the vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, a safety system is provided for use in a first vehicle at a first location. The safety system includes a position unit configured to determine the first location; a sensor group configured to detect an opening of the enclosure; a controller coupled to the position unit and the sensor group, the controller configured to generate a warning message including the first location when the opening of the enclosure is detected; and a transmitter coupled to the controller and configured to transmit the warning message.

In accordance with another exemplary embodiment, a method is provided for preventing collisions between a first vehicle that is stationary at a first location and a second vehicle that is in motion with a trajectory. The method includes determining, with a first safety system, the first location of the first vehicle; monitoring, with the first safety system, occupant activity in the first vehicle to detect an opening of the enclosure; transmitting, with the first safety system, a warning message with the first location when detecting the opening of the enclosure; receiving, with a second safety system, the warning message; and generating, with the second safety system, a warning for the second vehicle based on the warning message.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Broadly, exemplary embodiments discussed herein relate to vehicle safety systems and methods, including a number of such systems cooperating in a network. In one exemplary embodiment, a first safety system is associated with a first, parked vehicle and is configured to determine a location of the first vehicle and to anticipate an occupant opening a door. In response to a current or imminent door opening, the first safety system may broadcast a warning message indicating the location of the first vehicle. Cooperating safety systems associated with other vehicles, pedestrians, or bicycles may receive the warning message and, based on the position of the first vehicle, avoid the first vehicle as its door is opened.

Figure 1:
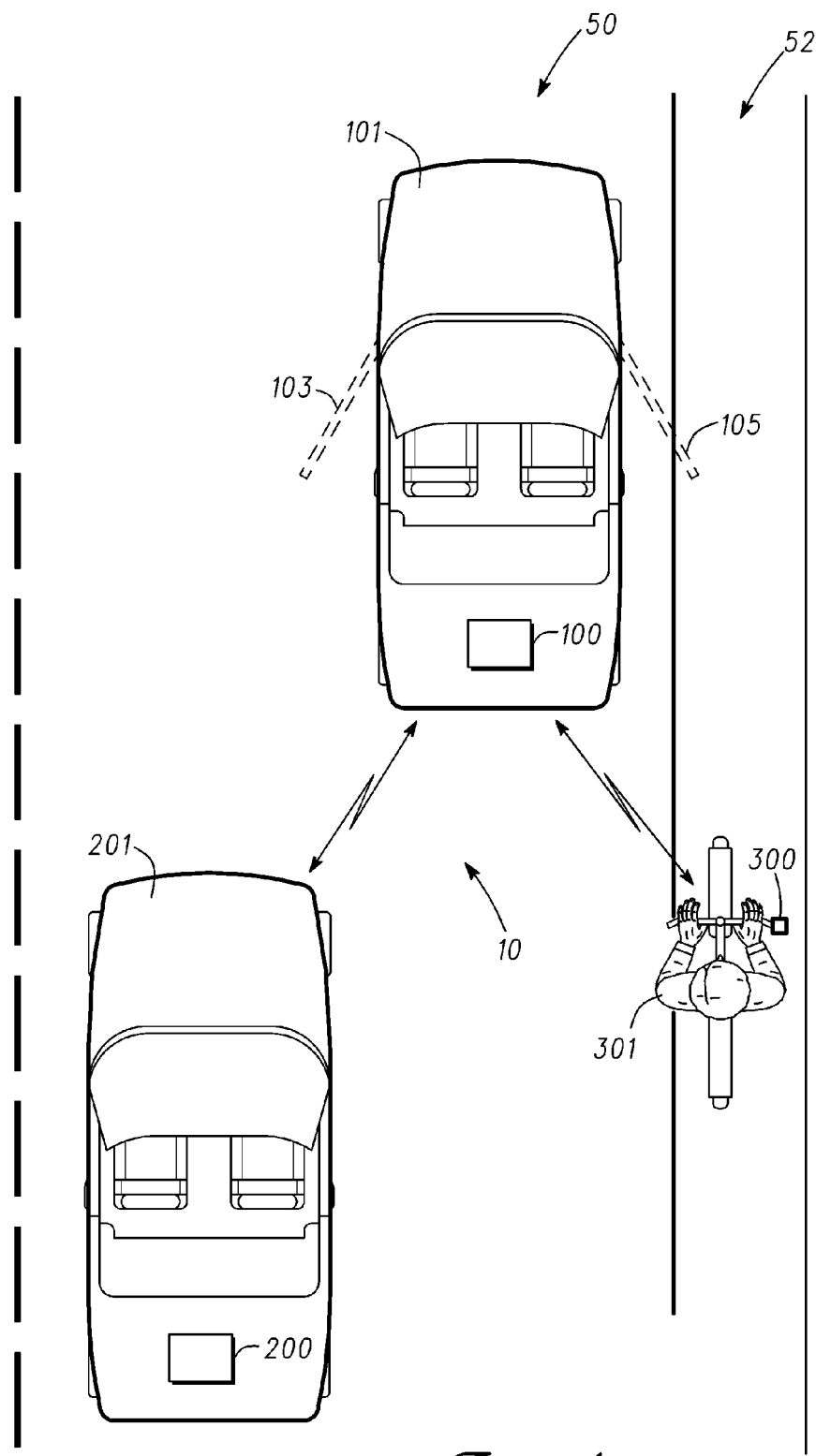
FIG. 1 depicts a vehicle with an exemplary safety system cooperating with a safety system in another vehicle and a safety system on a bicycle in accordance with an exemplary embodiment.

FIG. 1 depicts a first vehicle 101 with an exemplary first safety system 100 cooperating with a second safety system 200 in a second vehicle 201 and a third safety system 300 on a third vehicle, which in FIG. 1 is a bicycle 301. As described in further detail below, the safety systems 100, 200, 300 may be considered an ad-hoc network 10, although the extent of communication and cooperation may vary with the desired function of exemplary embodiments.

The exemplary safety systems 100, 200, 300 generally use V2X communications, which broadly encompasses vehicle-to-vehicle (V2V), vehicle-to-infrastructure (V2I), and vehicle-to-mobile (V2M) communications as cooperative systems based on one-way or two-way communications for interacting in real time. As the name suggests, V2M communications may involve communications between the vehicles 101, 201 and a mobile device, such as that carried by a pedestrian or mounted on the bicycle 301. For example, the V2X communications described herein may be executed on one vehicle by simply sending or receiving broadcast messages. Such messages typically are not directed to any specific recipient, but are meant to be shared with any compatible system within range to support the safety application. In some types of applications, if a higher level of response warrants, the safety systems 100, 200, 300 may engage in two-way communications.

In the depicted exemplary scenarios of FIG. 1, the first vehicle 101 is a stationary automobile parked along a road 50 adjacent to a sidewalk 52. The second vehicle 201 is in motion on the road 50 and intending to drive past the first vehicle 101. In most cases, the second vehicle 201 may safely pass by the first vehicle 101. However, in some scenarios, the first vehicle 101 may cause an unsafe situation for the second vehicle 201 as well as the first vehicle 101. One such situation is the unexpected opening of an enclosure, such as a driver door 103, as an occupant exits the first vehicle 101. In this scenario, the driver of the second vehicle 201 may be startled or have to swerve away from the opened driver door 103 to avoid impact with the first vehicle 101.

As also depicted in FIG. 1, the bicycle 301 is traveling down the sidewalk 52 and also intends to pass the first vehicle 101. Again, in most cases, the bicycle 301 may safely pass by the first vehicle 101. However, in some scenarios, the first vehicle 101 may cause an unsafe situation, such as when another enclosure, such as a passenger door 105, is opened. Like the second vehicle 201, the bicycle 301 may have to swerve out of the way of the opened passenger door 105 to avoid impact with the first vehicle 101. Although the driver door 103 and passenger door 105 are illustrated in FIG. 1, the safety systems discussed herein are may be similarly implemented with other enclosures, including roof enclosures, engine compartment enclosures such as hoods, trunk enclosures, and rear hatches.

Generally, as will be discussed below, the safety systems 100, 200, 300 cooperate to improve the safety of the occupants of the vehicles 101, 201 and the cyclist of the bicycle 301. For example, the safety system 100 of the first vehicle 101 may broadcast a warning message to be received by the respective safety systems 200, 300 of the second vehicle 201 and the bicycle 301 indicating a current or imminent ingress or egress by an occupant of the first vehicle 101, i.e., that one of the doors 103, 105 is currently being opened or will be opened. The warning message may include the location of the first vehicle 101, and optionally, the nature of the ingress or egress, such as which door 103, 105 is being opened. Other information that may be included in the message includes the number of occupants, types of occupants (e.g., children or disabled occupants), vehicle offset from curb, and/or door length. In a further embodiment, the status of wireless communications associated with an occupant may be included in the warning message. For example, such a warning message may indicate that the occupant is preoccupied with a telephone call or text message. In general, the information included in the warning message may be used to evaluate the level of threat or to filter an alert by any of the systems 100, 200, 300.

The warning message may be communicated to the driver of the second vehicle 201 and the cyclist of the bicycle 301 such that appropriate action may be taken by the respective operator, such as slowing down, steering away from the first vehicle 101, or merely more attentive operation of the second vehicle 201 or bicycle 301. In one exemplary embodiment, all warning messages are communicated to the driver of the second vehicle 201 and the cyclist of the bicycle 301. However, in other embodiments, the respective safety systems 200, 300 may filter the warning messages by comparing the location of the first vehicle 101 to the current or projected trajectory of the second vehicle 201 or bicycle 301 to determine if the opened door 103, 105 is likely to require evasive action or remedial steps on the part of the second vehicle 201 or the bicycle 301, respectively. For example, the respective safety systems 200, 300 may determine that the second vehicle 201 and bicycle 301 will pass safely by the open doors 103, 105 of the first vehicle 101 or that a door on the opposite side of the first vehicle 101 is being opened (e.g., door 103 does not pose a problem or threat for the bicycle 301). If the opened doors 103, 105 pose no threat, the safety systems 200, 300 may ignore the warning message. However, in potentially unsafe situations, the safety systems 200, 300 will provide a warning, such as a visual or audible warning. In further embodiments, the safety systems 200, 300, particularly safety system 200, will initiate an active safety response, for example, to autonomously slow down or steer away from the first vehicle 101. Further aspects of the safety systems 100, 200, 300 will be discussed below.

Although FIG. 1 depicts two examples of cooperating safety systems 100, 200, 300 (i.e., between a moving vehicle and a parked vehicle and between a parked vehicle and a bicycle), exemplary embodiments discussed herein may be incorporated into any number of scenarios. For example, aspects of the safety systems may be incorporated into a mobile device carried by a pedestrian, or in an alternate embodiment, the first vehicle 101 is also in motion instead of being stationary.

Figure 2:
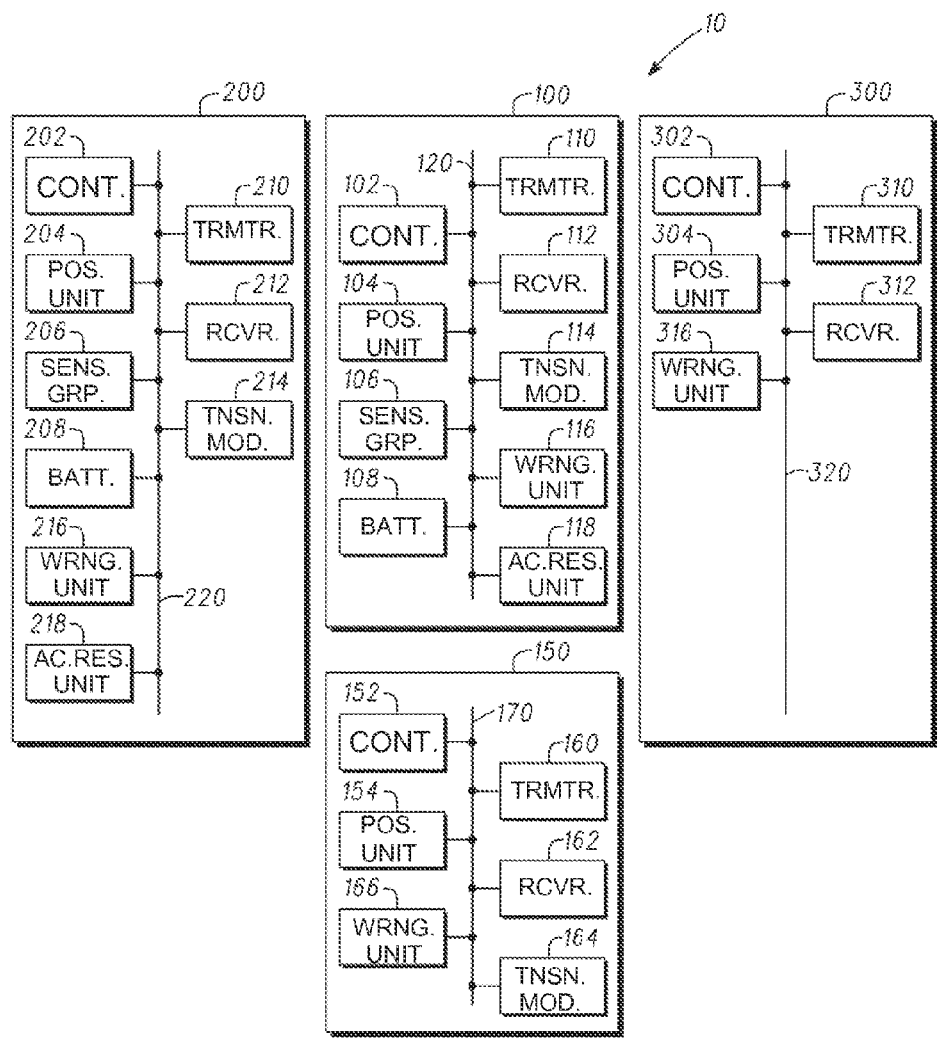
FIG. 2 is a block diagram of the safety systems of FIG. 1 in accordance with an exemplary embodiment.

FIG. 2 is a block diagram of the safety systems 100, 200, 300 of FIG. 1. The various illustrative blocks, modules, processing logic, and components described in connection with the embodiments disclosed herein may be implemented or performed with one or more of: a general purpose processor, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

In one exemplary embodiment, the first safety system 100 includes a controller 102, a position unit 104, a sensor group 106, a battery 108, a transmitter 110, a receiver 112, a transition module 114, a warning unit 116, and an active response unit 118 that are coupled together by a data communication link 120 onboard the first vehicle 101. Each component will be individually described prior to a more detailed discussion of the overall safety system 100 and the exemplary scenarios depicted in FIG. 1.

Generally, the controller 102 is configured to store and execute programmable instructions to carry out the functions of the first safety system 100 discussed below. The various tasks performed by the controller 102 may be implemented by software, hardware, firmware, or any combination thereof. In one exemplary embodiment, controller 102 may be an electronic control unit (ECU) of the first vehicle 101, and may additionally control various other systems of first vehicle 101, such as a stability control unit, a steering control unit, and a braking control unit. Generally, the data communication link 120 includes one or more onboard data communication buses that physically or wirelessly transmit data, status and other information or signals between various components of the first vehicle 101.

The position unit 104 is suitably configured to determine position data for the first vehicle 101 that indicates a current location. For example, the position unit 104 may collect information related to the latitude, longitude, altitude (relative to a reference, such as sea level), heading, pitch, and/or yaw of the first vehicle 101. In practice, the position unit 104 may include a global positioning system (GPS) and/or one or more inertial measurement units (IMUs) for determining the current coordinates of first vehicle 101 based on received GPS signals and/or dead reckoning techniques. The position unit 104 may also be configured to determine the position of the first vehicle 101 relative to the surrounding environment. For example, the position unit 104 may determine the position of the first vehicle 101 relative to the road 50 and the sidewalk 52, as well as other information about the environment such as data related to lane width or other information related to the road 50 and the existence of various objects in the zone of interest, such as trees, buildings, signs, light posts, and the like. For this purpose, the position unit 104 may store or have access to digital navigation maps.

The sensor group 130 may include sensors that detect various attributes of the environment surrounding the vehicle 101 and within the vehicle 101 itself. As such, the sensor group 130 may include both internal and external sensors, although depending on the embodiment, all or portions of the sensor group 130 described herein may be omitted.

In general, the external sensors of the sensor group 130 may include one or more long or short range sensors working together to generate data describing the external terrain and other objects within at least a portion of the area surrounding the vehicle 101 (hereinafter, the "target area"). Such sensors may include one or more Light Detection and Ranging (LIDAR) devices, cameras, radar devices, ultrasonic devices, 3D time-of-flight (TOF) lasers, or other types of sensors. As an example, cameras may include charged-coupled devices (CCD) or complementary metal oxide semi-conductor (CMOS) video image sensors to generate and identify images of objects within the target area. As another example, LIDAR devices transmit light and receive reflected light to determine various attributes of objects in of the target area. The external sensors of the sensor group 130 may be configured to detect a wide variety of objects, including other vehicles, pedestrians, animals, infrastructure, walls, poles, parking meters, uneven ground clearances, and the like.

The internal sensors of the sensor group 130 may similarly include one or more sensors working together to generate data describing activities within the vehicle 101. Such sensors may include pressure sensors and switches, LIDAR devices, cameras, radar devices, ultrasonic devices, 3D TOF lasers, and other types of sensors. For example, pressure sensors may be installed in locations such as the seats of the vehicle 101 to determine the position of the occupants. Cameras may track the movements of occupants. Other sensors may indicate the position of the ignition and door handle. Additional sensor input related to activities internal and external to the vehicle 101 may be provided by the vehicle speedometer, steering system, traction control signals, transmission control signals, and accelerator pedal position signals.

As will be described in greater detail below, the sensor group 106 particularly collects data indicating that the occupant is currently or intending to open one of the doors 103, 105. Such indications may include turning off the ignition, shifting the occupant's weight in the seat, reaching for a door handle, opening or closing a trunk or hood, and the like. The controller 102 may include data fusion algorithms to evaluate the data from the sensor group 106 and anticipate or detect the opening of one of the doors 103, 105.

The battery 108 may be any type of battery that supplies electrical energy to the other components of the safety system 100. In one exemplary embodiment, the battery 108 additionally provides electrical energy to the entire vehicle 100. In further embodiments, an alternative power source may provide electrical energy to the safety system 100, and the battery 108 may be omitted.

The transmitter 110 may be any device suitably configured to wirelessly transmit messages from the first vehicle 101. For example, the transmitter 110 may transmit such information in a broadcast manner (rather than a point-to-point manner) such that all receiving devices within the transmission range can potentially receive the information. In one exemplary embodiment, the transmitter 210 may be a relatively short range transmitter that is configured for compatibility with an appropriate short range wireless data communication scheme, such as IEEE Specification 802.11 (Wi-Fi), WiMAX, the BLUETOOTH™ short range wireless communication protocol, a Dedicated Short Range Communication (DSRC) system, or the like. For example, it may be desirable to employ a wireless data communication scheme having a range of about 1000 yards or less for purposes of the V2X communication described herein. In other embodiments, a cellular or satellite communication system may be utilized to wirelessly convey the data. Accordingly, the messages from the first safety system 100 may be formatted, arranged, and/or packaged as needed for transmission in a manner that is compatible with the particular wireless data communication technique and protocol.

The receiver 112 may be any device suitably configured to wirelessly receive information from other entities, including the second and third safety systems 200, 300. The information may include messages, location information, and other types of information. The receiver 112 may be deployed such that it also supports other wireless data communication features of the host vehicle. Like the transmitter 110, the receiver 112 may support wireless data communication schemes such as IEEE Specification 802.11 (Wi-Fi), BLUETOOTH™ short range wireless communication protocol, a Dedicated Short Range Communication (DSRC) system, cellular communications, satellite communications or the like. The receiver 112 may also be able to filter the received information for information of interest. For example, the receiver 112 may filter the information according to type of message or the sender of the message, i.e., the receiver 112 may disregard any message that does not potentially impact the first vehicle 101 or an occupant of the first vehicle 101.

The transition module 114 is generally any device that assists the transmitter 110 and/or receiver 112 in transferring communication from the transmitter 110 and/or receiver 112 to a second device, such as a mobile device 150 carried by an occupant of the first vehicle 101. In one exemplary embodiment, the transition module 114 may control operation according to a protocol to establish a link with another wireless device by exchanging link parameters that may define the characteristics of the links and/or define the characteristics of the information being communicated using the wireless links. The link parameters may include address information for a device such as, for example, a medium access control (MAC) address, an internet protocol (IP) address, or other types of addresses. The link parameters may also include timing and modulation information. As one example, the transition module 114 may establish a wireless link with the mobile device 150 and provide the mobile device 150 with sufficient information to transmit messages about the first vehicle 101, even after the transmitter 110 has ceased broadcasting, as will be discussed in greater detail below.

The warning unit 116 may be any type of device that generates a message to the occupant of the first vehicle 101. For example, the warning unit 116 may be a display device that renders various visual images (textual, graphic, or iconic) within a display area in response to commands received from the controller 102. Such a display device may be implemented on a dashboard, windshield, rearview mirror, A-pillar and/or door panel area and realized using a liquid crystal display (LCD), a thin film transistor (TFT) display, a plasma display, a light emitting diode (LED) display, or the like. In further embodiments, the warning unit 116 may be an acoustical device that outputs an audible warning signal to the occupant, or the warning unit 116 may be a haptic device that vibrates to provide a signal to the occupant. In one exemplary embodiment, the warning unit 116 may be configured to provide an audible warning to the occupant through a mobile phone or smartphone of the occupant, for example, by interrupting a telephone conversation and/or through any of the speakers on the phone. Similarly, the warning unit 116 may provide a visual warning on the smartphone of the occupant, for example, by interrupting a current smartphone application. Other visual warnings may include, for example, a visual projection of a warning on the back window or a flash sequence of brake lights.

During operation, the active response unit 118 may be used to automatically control the vehicle 101 based on signals from the controller 102. For example, the active response unit 118 may include, cooperate with, or be realized as a collision avoidance system. During operation, the active response unit 118 can analyze external objects to determine the likelihood of an imminent accident. In such cases, the operation of the first vehicle 101 can be controlled or adjusted in an attempt to avoid or mitigate accidents. In this regard, active response unit 118 may be configured to control the operation of onboard systems such as, without limitation: the braking system; the throttle system; the steering system; the fuel system; the electrical system; the traction control system; the telematics system; the airbag deployment system; and/or the driver interface system (e.g., warning indicators, alert notifications, display lights).

In a particular embodiment, the active response unit 118 may include a locking mechanism that prevents the doors 103, 105 from being opened. In another embodiment, the active response unit 118 can be a mechanical block that prevents or limits the doors 103, 105 from being opened. In a further embodiment, the active response unit 118 can provide a selectively variable force or resistance that restricts the rotation of the doors 103, 105 with respect to the first vehicle 101. In one exemplary embodiment, the active response unit 118 includes a fluid device or damper that dampens or stops movement of a piston assembly, thereby restricting rotation of the doors 103, 105. Other embodiments of the active response unit 118 may include electro-mechanical devices, piezoelectric devices, magnetic and/or materials configured to apply the selectively variable force to the doors 103, 105. The active response unit 118 may also function to adjust or tuck side mirrors, for example, if the safety system 100 detects an object in proximity to the doors 103, 105 and determines that the object will strike the side mirror.

The mobile device 150 may or may not be considered part of the safety system 100. In any event, the mobile device 150 may cooperate with the components of the safety system 100 mounted on the first vehicle 101. The mobile device 150 may be, for example, a cellular telephone or smartphone. In one exemplary embodiment, the mobile device 150 may include a controller 152, a position unit 154, a transmitter 160, a receiver 162, a transition module 164, and a warning unit 166. Generally, the components of the mobile device 150 operate in the same manner as the similarly-named components of the safety system 100 onboard the vehicle 101. For example, the position unit 154 is configured to determine the position of the mobile device 150 from, for example, GPS signals. The transmitter 160 and receiver 162 are generally configured to respectively send and receive messages in accordance with any number of wireless protocols, including Wi-Fi, BLUETOOTH™, DSRC, or cellular. The transition module 164 generally functions to transfer wireless communications links between the mobile device 150 and the safety system 100 mounted on the vehicle 101. The interaction between the mobile device 150 and other aspects of the network 10 will be discussed in greater detail below.

The second safety system 200 is also depicted in FIG. 2 and is generally similar or identical to the first safety system 100. Like the first safety system 100, the second safety system 200 includes a controller 202, a position unit 204, a sensor group 206, a battery 208, a transmitter 210, a receiver 212, a transition module 214, a warning unit 216, and an active response unit 218 that are coupled together on a data communication link 220 and operate according to the previous description of the similarly-named components of the first safety system 100. The interaction between the second safety system 200 and other aspects of the network 10 will be discussed in greater detail below.

The third safety system 300 is also depicted in FIG. 2. Like the first and second safety systems 100, 200, the third safety system 300 includes a controller 302, a position unit 304, a transmitter 310, a receiver 312, and a warning unit 316 that are coupled together on a data communication link 320 and operate according to the previous description of the similarly-named components of the first safety system 100. The interaction between the third safety system 300 and other aspects of the network 10 will be discussed in greater detail below.

The operation of the safety systems 100, 200, 300 will now be described. The situation described below corresponds to the situation depicted in FIG. 1 in which the first vehicle 101 is parked and the second vehicle 201 and bicycle 301 are moving past the first vehicle 101 as an occupant of the first vehicle 101 is preparing to exit the first vehicle 101. As such, in the description below, reference is made to both FIG. 1 and FIG. 2.

As noted above, the position unit 104 of the first safety system 100 determines the location of the first vehicle 101 and provides the location to the controller 102. The sensor group 106 monitors the activities of the occupants within the first vehicle 101, particularly for an indication that the occupant is preparing to exit the first vehicle 101 and open one of the doors 103, 105. One such indication would be the occupant pulling on a door handle or the door 103, 105 itself being ajar. For example, a capacitive sensor on the door handle may indicate the hand of an occupant touching the door handle. As another example, the sensor group 106 may include, biometric recognition, monitoring of the hand position of the occupant as he or she reaches for the doors 103, 105, or a combination of vehicle key recognition system and near range sensing. A further indication may be the position of the occupant in a vehicle seat in which a shift in weight indicates an imminent exit. Other activities that may be monitored include the position of the first vehicle 101 relative to a parking space or curb, turning the ignition off, opening the hood or trunk, unbuckling a seat belt, unlocking the doors 103, 105, and terminating a cellular or BLUETOOTH™ connection. Driver profile information about typical egress habits may also be considered. Any combination of factors may be used to deduce a current or imminent egress.

The controller 102 evaluates the data from the sensor group 106 until determining that an opening of one of the doors 103, 105 is occurring or imminent. At this point, the controller 102 initiates a warning message that is broadcast via the transmitter 110. The warning message may include the location of first vehicle 101, and optionally, the nature of the occupant activity, such was which door 103, 105 is about to be opened. The warning message may also indicate the urgency of the situation, such as whether the door opening is merely anticipated or already in progress. For example, in one exemplary embodiment, the warning message is only initiated when the door is ajar, while in other embodiments, the factors discussed above merely suggest that such an opening is imminent. The controller 102 may direct power to be supplied from the battery 108 even after the ignition has been turned off such that the safety system 100 may monitor the occupant action and, if necessary, broadcast a warning message.

In one exemplary embodiment, the first safety system 100 may periodically broadcast the warning message for a predetermined amount of time or until a subsequent occupant action, such as the closing or locking of the door 103, 105. In one exemplary embodiment, the first safety system 100 broadcasts the warning message in all ingress or egress situations. In another embodiment, the first safety system 100 may evaluate the environment surrounding the first vehicle 101 via the sensor group 106 and the controller 102 and only broadcast the warning message when another vehicle or object is located in the vicinity of the first vehicle 101 or is projected to contact the vehicle 101 or the doors 103, 105.

In addition to broadcasting the warning message, the first safety system 100 may also generate a warning signal to the occupant of the first vehicle 101 via the warning unit 116. In further embodiments, the active response unit 118 may arrest or slow the motion of the door 103, 105 being opened to reduce the potential of damage to the vehicle 101. In one exemplary embodiment, the response of the safety system 100 can be based on a threat assessment, which may include consideration of the type of object, the speed of the object and/or vehicle, and a time-to-collision determination.

The warning message transmitted by the first safety system 100 may be received by the second safety system 200 of the second vehicle 201 via the receiver 212. The controller 202 evaluates the position and trajectory of the second vehicle 201 via the positioning unit 204 and compares the trajectory to the location of the first vehicle 101 provided in the warning message. If there is a potential for impact between the doors 103, 105 and the second vehicle 201, the controller 202 initiates a warning signal to the driver of the second vehicle 201 via the warning unit 216. At that time, the driver of the second vehicle 201 may take action to avoid the first vehicle 101, such as by slowing down or swerving away from the first vehicle 101. If the controller 202 determines that the second vehicle 201 will not impact the first vehicle 101, the second safety system 200 will effectively ignore the warning message from the first vehicle 101 by not warning the driver or initiating additional action. This evaluation may be supplemented by factors such as the road conditions, speed, or lane width.

In addition to warning the driver of the second vehicle 201, the second safety system 200 may also initiate an active safety response via the active response unit 218. For example, the active response unit 218 may automatically slow down the second vehicle 201 or automatically swerve the second vehicle 201 away from the first vehicle 101 based on a trajectory of the second vehicle 201 and the location of the first vehicle 101. Other active responses may be to prime the brakes or to activate the horn of the second vehicle 201. The dynamic response of the safety system 200 may be based on vehicle speed and imminence of danger. Other considerations may include operational aspects of the vehicle 101, such as steering position, yaw rate, lateral acceleration, and longitudinal acceleration. In this context, various operational values may be compared with predefined set point values and the sensor data of the safety system 200 to initiate dynamic responses, including systems such an antilock brake system and/or electronic stability program.

The warning message transmitted by the first safety system 100 may also be received by the third safety system 300, which may react in a similar manner as the second safety system 200. For example, the third safety system 300 receives the warning message from the first safety system 100 via the receiver 312 that includes the location of the first vehicle 101 and/or an intended action of an occupant in the first vehicle 101. The position unit 304 provides the position and trajectory of the bicycle 301 to the controller 302, and the controller 302 compares the trajectory of the bicycle 301 to the location of the first vehicle 101. If the bicycle 301 has the potential to impact the first vehicle 101, the third safety system 300 provides a warning to the cyclist with the warning unit 316, such as a flashing light or a noise.

As noted above, in a further embodiment, the first safety system 100 includes or cooperates with the mobile device 150. In one exemplary embodiment, the mobile device 150 receives the warning message from the first safety system 100 via the receiver 162 and rebroadcasts the message via the transmitter 160. The mobile device 150 may rebroadcast the warning message for a predetermined amount of time after cessation of the broadcast by the first safety system 100, for example, to provide additional warning messages to the second and third safety systems 200, 300 while the door 103, 105 is still open or as the occupant crosses the road 50. In a further embodiment, the first safety system 100 transfers control of the warning message to the mobile device 150 via the respective transition modules 114, 164 after a predetermined amount of time or event, such as prior to the cessation of the broadcast by the transmitter 110 of the first safety system 100. Similarly, the mobile device 150 may cease broadcasting the warning message after a predetermined amount of time or event, such as when the position unit 154 indicates that the occupant has completed crossing the street 50.

The scenarios described above generally involve an occupant exiting the first vehicle 101. However, the safety systems 100, 200, 300 may function in a similar manner when an occupant is entering the first vehicle 101. For example, when an occupant approaches the first vehicle 101, the mobile device 150 may sense the first vehicle 101, either by comparing the respective positions or by recognizing a signal or other digital signature broadcast from the first vehicle 101. In response, the mobile device 150 may recognize that the door 103, 105 is about to be opened and begin broadcasting a warning message to be received by the second and third safety systems 200, 300 as described above. In another embodiment, the first safety system 100 may recognize an approaching occupant and anticipate a door opening, for example, based on a message or signal from the mobile device 150. In response, the first safety system 100 initiates broadcasting of the warning message as described above. In a further embodiment, the warning message may be initiated by unlocking the doors 103, 105 of the first vehicle 101, for example, via a key fob. Additionally, in some embodiments, the safety systems 100, 200, 300 may be interchangeable. In other words, if first vehicle 101 is in motion and the second vehicle is parked, the first safety system 100 may function in the manner described above for the second safety system 200 and vice versa.

As such, both the second and third safety systems 200, 300 may initiate appropriate responses based on the warning message of the first safety system 100 to reduce potential accidents. Various exemplary embodiments described herein integrate communication functionality into a safety system, including in situations after the ignition has been turned off.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. The processing and data communication functions described herein are performed in a rapid and periodic manner. Indeed, the function iterations described above may be completed in several milliseconds, resulting in nearly real-time updating and processing of safety information. Such rapid processing and response times are desirable to support a practical deployment that must contemplate vehicles traveling at suitable speeds.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A safety system for use in a first vehicle at a first location, the first vehicle having an enclosure, the safety system comprising: a position unit configured to determine the first location; a sensor group configured to detect an opening of the enclosure; a controller coupled to the position unit and the sensor group, the controller configured to generate a warning message including the first location when the opening of the enclosure is detected; and
   a transmitter coupled to the controller and configured to transmit the warning message, wherein the sensor group is further configured to monitor occupant activity in the first vehicle, and the controller is further configured to anticipate the opening of the enclosure based on the occupant activity and to generate the warning message when the opening of the enclosure is anticipated; wherein the controller is further configured to anticipate the opening of the enclosure based on the first location.

2. The safety system of claim 1, wherein the sensor group includes a camera to monitor the occupant activity.

3. The safety system of claim 1, wherein the first vehicle includes a seat and wherein the sensor group includes a pressure sensor within the seat to monitor the occupant activity.

4. The safety system of claim 1, wherein the warning message identifies the opening of the enclosure as being anticipated or open.

5. The safety system of claim 1, wherein the first vehicle includes an ignition and the transmitter is configured to continue to transmit the warning message after the ignition is turned off.

6. The safety system of claim 1, wherein the transmitter is configured to continue to transmit the warning message until the enclosure is closed.

7. The safety system of claim 1, further comprising a transition module coupled to the controller and configured to transfer transmission of the warning message from the transmitter to a mobile device.

8. The safety system of claim 1, wherein the warning message identifies a position of the enclosure.

9. The safety system of claim 1, wherein the transmitter comprises a short range transmitter configured to broadcast the warning message to other vehicles.

10. A method for preventing collisions between a first vehicle that is stationary at a first location and includes an enclosure and a second vehicle that is in motion with a trajectory, the method comprising the steps of:
   determining, with a first safety system, the first location of the first vehicle;
   monitoring, with the first safety system, occupant activity in the first vehicle to detect an opening of the enclosure;
   anticipating, with the first safety system, an opening of the enclosure based on the first location,
   transmitting, with a transmitter of the first safety system, a warning message with the first location when the opening of the enclosure is anticipated;
   receiving, with a second safety system, the warning message; and
   generating, with the second safety system, a warning for the second vehicle based on the warning message.

11. The method of claim 10, further comprising the step of evaluating, with the second safety system, a collision threat between the first vehicle and the second vehicle based on the first location and the trajectory.

12. The method of claim 10, further comprising the step of transmitting, with a mobile device, the warning message.

13. The method of claim 10, further comprising the step of automatically initiating an active safety response based on the warning message.

14. The method of claim 13, wherein the initiating step includes slowing down the second vehicle.

15. The method of claim 13, wherein the anticipating step includes anticipating the opening of the enclosure based on the first location.

16. The method of claim 13, wherein the monitoring step includes monitoring occupant activity with a camera in the first vehicle or a pressure sensor in a seat of the first vehicle.

17. The method of claim 10, wherein the monitoring step includes monitoring non-occupant activity with the first safety system, and wherein the anticipating step includes anticipating, with the first safety system, the opening of the enclosure by the non-occupant.

18. The method of claim 17, wherein the monitoring step includes monitoring the non-occupant activity by receiving a broadcast from a mobile device of the non-occupant.

19. A safety system for use in a first vehicle at a first location, the first vehicle having an enclosure, the safety system comprising:
   a position unit configured to determine the first location;
   a sensor group configured to detect an opening of the enclosure;
   a controller coupled to the position unit and the sensor group, the controller configured to generate a first warning message including the first location when the opening of the enclosure is anticipated;
   a transmitter coupled to the controller and configured to transmit the first warning message;

a receiver coupled to the controller and configured to receive a second warning message from a second vehicle; and an active response unit configured to automatically initiate an active response based on the first warning message or the second warning message.

* * * * *